Figure 1:
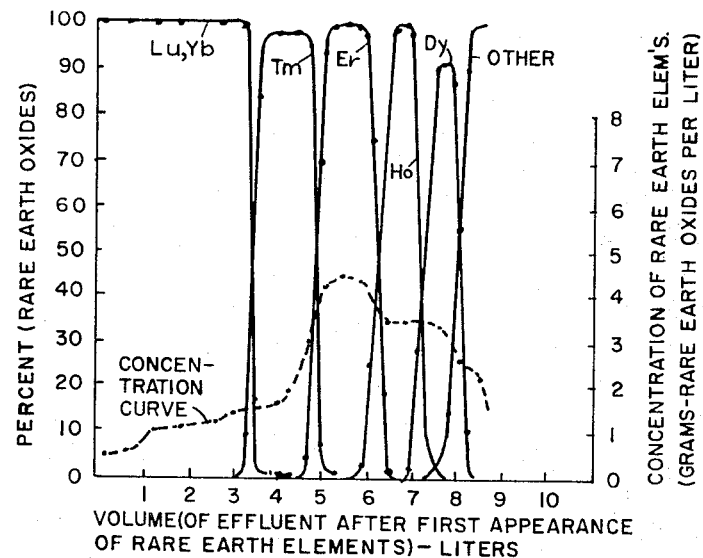

United States Patent

[11] 3,615,173

| [72] | Inventors | J. Oscar Winget<br>Sparks;<br>Roald E. Lindstrom, Reno, both of Nev. |
|---|---|---|
| [21] | Appl. No. | 813,048 |
| [22] | Filed | Apr. 3, 1969 |
| [45] | Patented | Oct. 26, 1971 |
| [73] | Assignee | The United States of America as represented by the Secretary of the Interior |

[54] SEPARATION OF RARE EARTH ELEMENTS BY ION EXCHANGE
2 Claims, 3 Drawing Figs.

[52] U.S. Cl.................................... 23/23, 23/183
[51] Int. Cl............................................ C22b 59/00
[50] Field of Search........................................ 23/22, 23, 312 ME

[56] References Cited
UNITED STATES PATENTS

| 2,798,789 | 7/1957 | Spedding et al. | 23/23 X |
| 2,956,858 | 10/1960 | Spedding et al. | 23/22 |
| 3,054,655 | 9/1962 | Krumholz et al. | 23/23 |
| 3,167,389 | 1/1965 | Woyski | 23/23 X |
| 3,228,750 | 1/1966 | Lindstrom et al. | 23/22 |
| 3,482,932 | 12/1969 | Gump | 23/22 |

OTHER REFERENCES

Asher et al., " Industrial & Engineering Chemistry-Process Design and Development," Vol. N, Jan. 1962, pp. 52– 56.

*Primary Examiner*—Herbert T. Carter
*Attorneys*—Ernest S. Cohen and William S. Brown

ABSTRACT: Diethylenetriaminepentaacetic acid or hydroxyethylethylenediaminetriacetic acid is used as retaining agent in separating rare-earth elements on a cation-exchange resin column. The rare-earth metals and their compounds find a wide variety of uses such as use in special alloys, in lasers, in dielectric ceramics, in nuclear technology, in phosphors, etc.

PATENTED OCT 26 1971 3,615,173

INVENTORS
J. OSCAR WINGET
ROALD E. LINDSTROM

BY
ATTORNEYS

SEPARATION OF RARE EARTH ELEMENTS BY ION EXCHANGE

Separation of "rare earths," i.e., the elements having atomic numbers 39 and 57 through 71, on ion-exchange columns is conventional and is disclosed in U.S. Pat. No. 3,228,750. A variety of materials have been used as retaining agents in such processes, e.g., divalent copper, zinc and hydrogen. The use of copper, however, has the disadvantage that chelate collected prior to rare-earth breakthrough is very stable and recovery of EDTA (ethylenediaminetetraacetic acid, used as eluant) and copper for reuse is difficult. Zinc has the disadvantage that the heavier rare-earth elements bleed through the zinc-retaining agent. The use of hydrogen as retaining ion has the disadvantage that EDTA sorbs on the hydrogen-cycle resin and eventually elutes from the system 1.5 to 2 times as concentrated as the original eluant.

It is therefore an object of the present invention to provide a process using a nonmetallic retaining agent to eliminate contamination of the rare-earth products and to allow recovery and reuse of eluant and retaining agents without extensive processing.

It has now been found, according to the present invention, that the disadvantages of the prior art processes can be largely overcome by the use of DTPA (diethylenetriaminepentaacetic acid) or HEDTA (hydroxyethylethylene-diaminetriacetic acid) as retaining agent in separation of the rare earths on cation-exchange resin columns, using EDTA as eluant.

In the practice of the invention the rare earths are first adsorbed on a cation-exchange resin column (usually in the ammonium or hydrogen cycle) in the conventional manner, and this column is then physically connected with a second cation-exchange resin column or columns having the resin in the DTPA or HEDTA cycle. The columns are heated in conventional manner in order to keep the acid form of the EDTA, as well as the DTPA and HEDTA, in solution. An aqueous EDTA solution is then passed in sequence through the column containing the adsorbed rare earths and the column containing the resin in the DTPA or HEDTA cycle. The rare earths are thereby eluted from the first resin bed in the form of rare-earth EDTA-complexes and these complexes then exchange with DTPA or HEDTA agents on the second column, resulting in separation of the rare earths into individual bands on the second column.

The following reactions are typical of those that take place in the columns as the process proceeds:

1. If the rare earths are sorbed on ammonium cycle resin from a chloride solution the exchange that takes place is represented as:

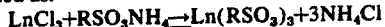
$LnCl_3 + RSO_3NH_4 \rightarrow Ln(RSO_3)_3 + 3NH_4Cl$ where Ln is the trivalent rare-earth ions, $RSO_3NH_4$ is the exchange sites on the resin.

2. When DTPA or HEDTA are sorbed on hydrogen-cycle resin the reaction is as follows:

$Z + 2RSO_3H \rightarrow (RSO_3)_2ZH_2$ where Z represents the DTPA or HEDTA.

3. When the EDTA eluant contacts the rare-earth cycle resin the exchange that takes place is represented by:

$(NH_4^+)_{3y}{}^{1+}{}_{Ln(RSO_3)_3} \rightarrow LnY^1 + H^+ + 3RSO_3NH_4$ where Y is the EDTA-ion and $LnY^1$ the rare-earth chelate.

4. When the rare-earth EDTA-chelate contacts the DTPA or HEDTA-cycle resin the exchange is:

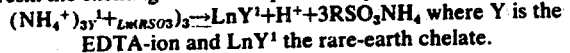
$2LnY^1H^+ + 3(RSO_4)_2ZH_2 \rightarrow 2(RSO_4)_3Ln + 3Z + 2H_4Y$ The acid form of the EDTA and DTPA or HEDTA are washed out of the column and as the effluent solution cools EDTA precipitates and is removed by filtration. The effluent solution is then passed through a heated column (s) of hydrogen-cycle resin and the retaining agent is sorbed on the resin.

The cationic-exchange resins, ion-exchange columns and EDTA eluant used in the process of the invention are all conventional and are described in U.S. Pat. No. 3,228,750.

The process is operable over a range of eluant pH values, concentrations and temperatures. The temperature must be maintained above the solubility in water of the acid form of the EDTA and retaining agent for the eluant concentration selected. Generally, temperatures in the range of about 85° to 95° C. are satisfactory. In general, the influent eluting solution pH must be such that lanthanum EDTA chelate does not precipitate in the column and low enough that the pH of the rare-earth samples collected is approximately 2.5. The operable pH range will vary with the concentration. For practical considerations, it is best to use the highest possible eluant pH because the EDTA is more efficiently used than at lower pH values. If the eluant concentration is between 6 and 8 grams of EDTA per liter, the most effective eluant pH is approximately 8.5. At higher pH values, the metal ions tend to bleed through the retaining agents. The concentration of EDTA in the eluant may vary from 3 to 10 grams per liter.

The resin column having the resin in the DTPA or HEDTA cycle is readily prepared by sorbing the DTPA or HEDTA from a hot aqueous solution (temperature about 75° to 85°C.) onto hydrogen-cycle resin in the column. Treatment of the hydrogen-cycle resin with the DTPA or HEDTA solution is preferably continued until the resin is substantially completely saturated with DTPA or HEDTA, i.e., until no further adsorbtion of DTPA or HEDTA takes place. Time of the treatment and volume of DTPA or HEDTA solution required will, of course, vary greatly with the type and particle size of the resin, size of the column, concentration and temperature of the DTPA and HEDTA solution, etc. and are best determined experimentally.

The following examples will serve to more particularly illustrate the invention. In these examples essentially complete recovery of HEDTA and DTPA retaining agents was effected. In addition, 85 percent of the EDTA that passed through the system before the appearance of erbium was recovered. Precipitation of EDTA from HEDTA or DTPA eluates was easily accomplished by cooling the solutions. The retaining agent is recovered by passing the EDTA-free filtrate through hydrogen-cycle resin heated to 80° C., thereby sorbing the HEDTA or DTPA on the resin for reuse as the retaining agent for the next run. The eluant and retaining agent can be recovered from fractions containing small amounts of rare-earth elements by allowing the EDTA to precipitate, filtering, and then precipitating the rare-earth ions with oxalic acid. After filtering the rare-earth oxalates, the filtrate is passed through heated hydrogen-cycle resin to sorb the HEDTA, whereupon the excess oxalic acid is washed out of the resin.

Experiments were conducted in ion-exchange columns consisting of glass tubes 122 cm. long and having an inside diameter of 1.6 cm. The columns were filled to a height of 110 cm. with 50-to100-mesh ammonium-cycle nuclear sulfonic resin, cross-linked with 4 percent divinylbenzene (Dowex 50). The column temperature was maintained at 85° to 90° C. and was measured with a thermistor probe extending about 3 inches into the bottom of the resin bed. Charge solutions were prepared by dissolving mixtures of rare-earth oxides in hydrochloric acid. The rare-earth mixture was sorbed on the first of three columns to be connected in series. The retaining agent was dissolved in hot water and sorbed on hydrogen-cycle resin in the second and third columns connected in the series. Eluting flow through the columns was 5 ml./min./sq.cm. of column cross-sectional area and was from top to bottom through each column in the series.

Rare-earth elements in the effluent were precipitated as oxalates, ignited to oxides, and analyzed by X-ray emission spectroscopy.

Concentration of unchelated EDTA in the effluent was determined gravimetrically from the EDTA that precipitated on cooling the column effluents. Concentrations of HEDTA and DTPA were determined by titrating aliquots of the effluent with 0.01 molar calcium acetate.

EXAMPLE 1

In this example DTPA was used as retaining agent. A mixture of 0.5 percent lutetium, 30 percent ytterbium, 8 percent thulium, 28 percent erbium, 18 percent holmium, 14 percent dysprosium, and 17 percent other rare earths was eluted with a 7 g./l. EDTA solution at pH 8.0 from the cation-exchange resin in the first column through the second two columns having resin in the DTPA cycle. Results are shown in FIG. 1.

EXAMPLE 2

Figure 2:
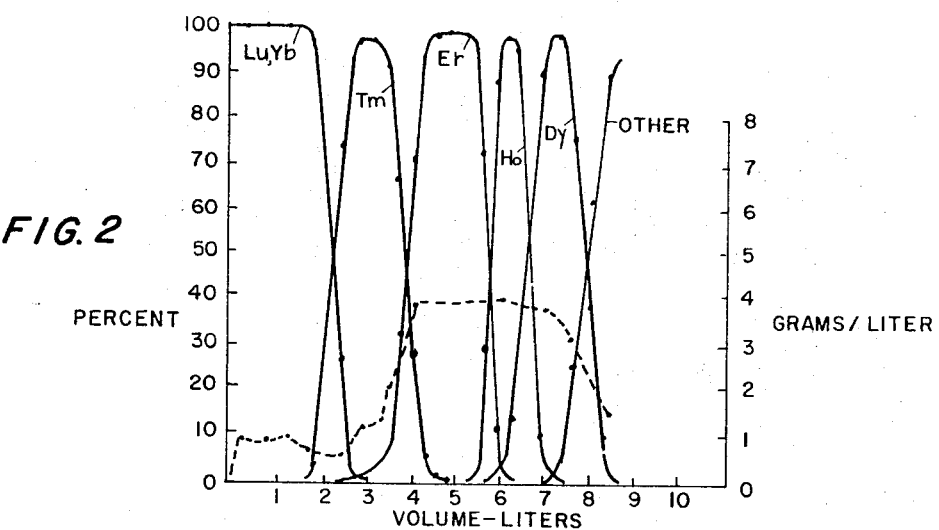

This example was similar to that of example 1 except that HEDTA was used as retaining agent. Results are shown in FIG. 2.

EXAMPLE 3

Figure 3:
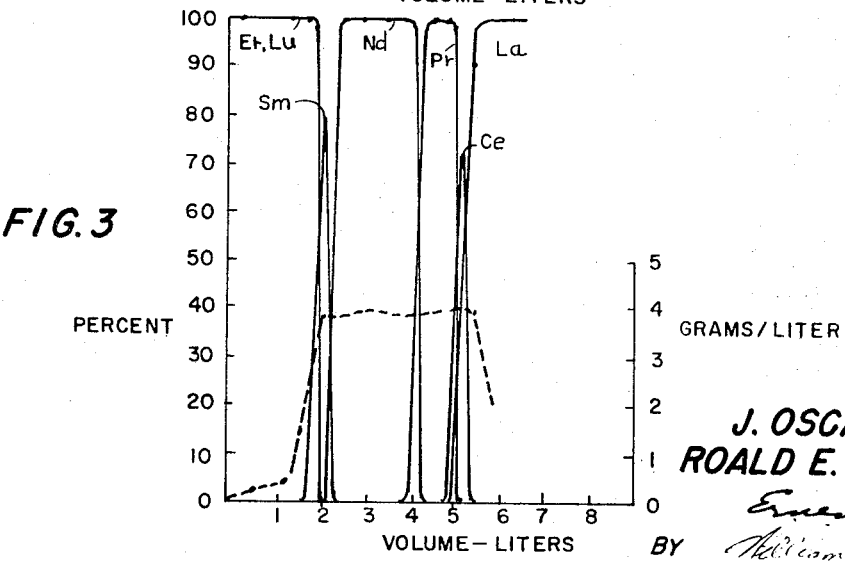

In this example HEDTA was again used as retaining agent. A mixture of 19 percent lanthanum, 3 percent cerium, 20 percent praseodymium, 48 percent neodymium, 4 percent samarium, and 5 percent other rare-earth elements was eluted with a 7 g./l. EDTA solution at pH 9.0 from the cation-exchange resin in the first column through the second two columns having resin in the HEDTA cycle. Results are shown in FIG. 3.

What is claimed is:

1. A process for the separation of rare-earth elements comprising (1) providing at least two cation-exchange resin beds in series, (2) sorbing a mixture of the rare-earth elements on the first resin bed, (3) sorbing a retaining agent consisting essentially of diethylenetriaminepentaacetic acid or hydroxyethylethylenediaminetriacetic acid on the succeeding resin beds, (4) passing an eluant comprising an aqueous solution of ethylenediaminetetraacetic acid sequentially through the rare-earth-cycle resin and the retaining agent cycle resin, the temperature of the eluant being about 85° to 95° C., the pH of the eluant being about 8.0 to 9.0 and the concentration of said acid in the eluant being about 3 to 10 grams per liter, and (5) collecting successive portions of eluate containing separated rare-earth elements in solution.

2. The process of claim 1 in which the resin beds are maintained at an elevated temperature sufficient to maintain the eluant and retaining-agent compounds in solution.

* * * * *